(12) United States Patent
Canfield et al.

(10) Patent No.: US 6,310,922 B1
(45) Date of Patent: *Oct. 30, 2001

(54) METHOD AND APPARATUS FOR GENERATING VARIABLE RATE SYNCHRONIZATION SIGNALS

(75) Inventors: Barth Alan Canfield, Indianapolis, IN (US); Harold Blatter, Tucson, AZ (US)

(73) Assignee: Thomson Consumer Electronics, Inc., Indianapolis, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/571,040

(22) Filed: Dec. 12, 1995

(51) Int. Cl.[7] ..................................................... H04N 5/05
(52) U.S. Cl. ........................................ 375/240.28; 348/524
(58) Field of Search ................................... 348/500, 521, 348/524, 389, 390, 395, 403, 536, 537, 540–548, 423, 512, 511; 331/16, 3; 455/260; 375/374, 376; 395/551, 552; H04N 5/05

(56) References Cited

U.S. PATENT DOCUMENTS

| | | | |
|---|---|---|---|
| 3,581,011 | * 5/1971 | Ward et al. | 348/524 |
| 4,169,659 | * 10/1979 | Marlowe | 348/524 |
| 4,268,853 | * 5/1981 | Nakamura et al. | 348/521 |
| 4,295,157 | * 10/1981 | Machida et al. | 348/524 |
| 4,500,909 | * 2/1985 | Machida | 348/524 |
| 4,517,587 | * 5/1985 | Aizawa et al. | 348/521 |
| 4,520,394 | * 5/1985 | Kaneko | 348/546 |
| 4,679,005 | * 7/1987 | Tatami | 331/16 |
| 4,847,875 | * 7/1989 | Choi | 375/376 |
| 5,179,729 | * 1/1993 | Mishima et al. | 455/260 |
| 5,235,531 | * 8/1993 | Foerg | 364/703 |
| 5,319,681 | * 6/1994 | Meyer | 375/374 |
| 5,381,181 | * 1/1995 | Deiss | 348/423 |
| 5,459,789 | 10/1995 | Tamer et al. | 380/20 |
| 5,502,502 | * 3/1996 | Gaskill et al. | 348/546 |
| 5,721,514 | * 2/1998 | Crockett et al. | 331/3 |
| 5,742,799 | * 4/1998 | Alexander et al. | 395/552 |

FOREIGN PATENT DOCUMENTS

| | | | |
|---|---|---|---|
| 280 126 A2 | 8/1988 | (EP) | H03K/23/66 |
| 491 064 A1 | 6/1992 | (EP) | H03K/23/68 |
| 624 982 A2 | 11/1994 | (EP) | H04N/7/13 |
| 624 983 A3 | 11/1994 | (EP) | H04N/7/13 |
| WO94/24670 | 10/1994 | (WO) | G11B/27/02 |

* cited by examiner

Primary Examiner—Young Lee

(57) ABSTRACT

A programmable synchronizing system for selectively providing synchronizing signals at different rates, such as for incorporation in a video signal decompression system, includes an oscillator and a programmable counter. The programmable counter is conditioned to count pulses from the oscillator by alternate moduli in predetermined sequences to generate the synchronizing signals. The desired synchronization rate is effectively the average of the counter output resulting from counting by the alternate moduli.

15 Claims, 6 Drawing Sheets

LEGEND N1 = 1121; N2 = 1123; N3 = 1125; N4 = 1127; N5 = 1129; N6 = 1131

METHOD AND APPARATUS FOR GENERATING VARIABLE RATE SYNCHRONIZATION SIGNALS

The present invention is related to the generation of synchronizing signals having different frequencies, a particular example of which provides different frame synchronization rates for display of the different modes of video signal conveyed in MPEG compressed form. MPEG herein refers to compression standards sponsored by the Motion Picture Experts Group of the International Standardization Organization or ISO.

BACKGROUND OF THE INVENTION

The invention will be described in the environment of an MPEG video signal receiver, but should not be considered to be limited to either the use with video signals or to MPEG signal processing systems.

The MPEG standards for compressed video signal are extremely flexible in that video signals having different display modes may be compressed and transmitted. For example, source signals of different respective frame rates may be compressed and compatible receivers are expected to be capable of reproducing and displaying the respective signal at the appropriate frame rate. In particular, the Grand Alliance High Definition Television system currently undergoing examination by the FCC, accommodates MPEG compressed video signals having frame rates of 29.97002997 . . . Hz or 30.000000 Hz. The compressed signal includes a data field indicating the frame rate of the received signal, and Grand Alliance compliant receivers, responsive to this data field are adaptively re configured to display the received signal at the indicated frame rate.

System level MPEG compressed signal incorporates synchronization signals in the form of time stamps. These time stamps are referenced to a video signal compressor system clock signal of 27 MHz. One of these time stamps, designated the Presentation Time Stamp or PTS, occurs in the video level of compressed signal, is synchronized with the occurrence of frames of the source signal being compressed, and is determinative of the precise time a decompressed frame is to be displayed by respective receivers. A second time stamp, designated the System Clock Reference or SCR is incorporated in the system level of the compressed signal. At the system level, the compressed video signal is segmented into discreet packets. SCR's are included in ones of these packets, which SCR's are indicative of the precise time the associated packet is formed/transmitted. The SCR's are utilized by respective receivers to synchronize a system clock in the receiver to the system clock in the compression apparatus.

Synchronization of the receiver system clock to the compression apparatus system clock minimizes the amount of memory required in respective receivers to rate buffer the received signal. The receiver system clock is nominally utilized by the decompression apparatus for decoding the compressed signal. Since the receiver system clock is synchronous with the compression apparatus system clock, to which the PTS's are referenced, the display of the decoded signals may also be timed via the receiver system clock. However, there are disadvantages in using a signal clock reference in broadcast signal receivers. For example, not infrequently transmitted data may be lost or corrupted, and error concealment processes must be performed on the decompressed signal. These processes tend to disrupt the normal flow of decoded data, and possibly prevent normal display of frames in accordance with associated PTS's. Also, various display features, such as freeze frame, may be implemented, which disrupt the appropriate association of PTS's with the system clock.

SUMMARY OF THE INVENTION

The present invention includes a programmable synchronizing system for selectively providing synchronizing signals at different rates. In a particular embodiment the programmable synchronizing system is incorporated in a video signal decompression system having a first synchronizing system for developing a system clock signal and a second synchronizing system for providing video signal display synchronization signals. In a specific embodiment, a synchronizing system for selectably providing synchronizing signals at different rates, includes an oscillator and a programmable counter. The programmable counter is conditioned to alternately count pulses from the oscillator by first and second divisors to generate the synchronizing signals. The desired synchronization rate is effectively the average of the counter output resulting from counting by the alternate divisors.

DETAILED DESCRIPTION OF THE DRAWINGS

Figure 1:
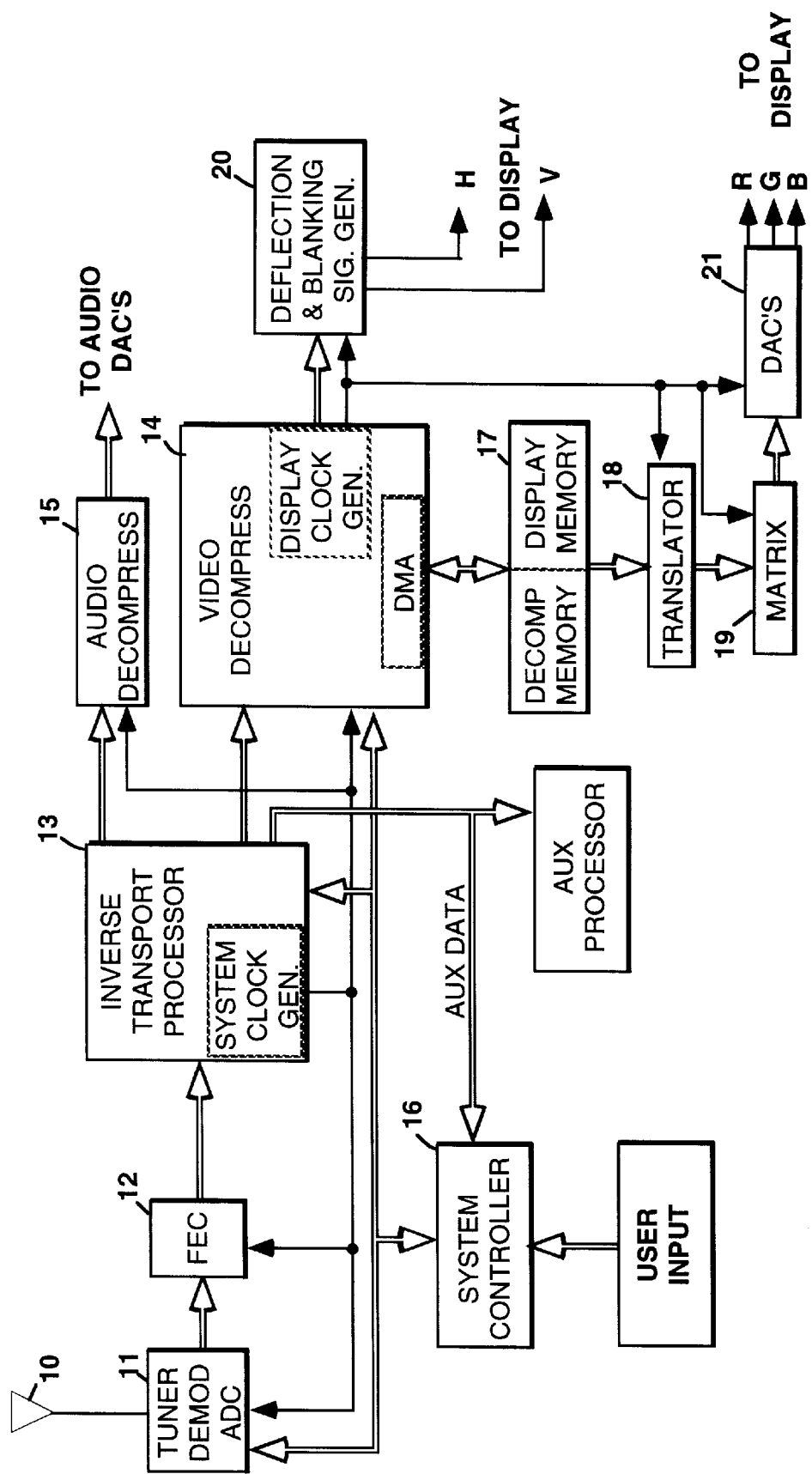
FIG. 1 is a block diagram of a MPEG compatible video signal receiver, embodying the invention.

Referring to FIG. 1, transmitted compressed video signal, e.g. MPEG compatible signal, is detected in an antenna 10 and applied to a tuner-demodulator 11. The tuner-demodulator 11 may include equalization circuitry and an analog-to-digital converter. The tuner-demodulator, under control of a system controller 16, tunes to a desired channel, detects and demodulates a desired frequency carrier and provides a baseband digital signal to a forward error correction circuit 12. The circuit 12 may include Reed-Solomon error correction and trellis decoding circuitry for correcting transmission induced errors in the received signal. Error corrected signal is applied to an inverse transport processor 13.

The inverse transport processor, performs a number of functions including separating desired compressed signal packets from a time multiplexed packet stream, extracting packet payloads from selected packets, decrypting encrypted signal payloads, rate buffering selected signals and generating the receiver system clock. A detailed description of exemplary inverse transport processor circuitry may be found in U.S. Pat. No. 5,459,789. Separated compressed audio signal is applied to an audio signal decompressor 15, separated compressed video signal is applied to a video decompressor 14, and separated data signal, such as a program guide, is applied to the system controller 16, which may include a microprocessor.

The video signal decompressor includes circuitry which cooperates with decompression memory 17 to decompress the received video signal. Decompressed video signal is loaded in a portion of memory 17 where it is available for display at the appropriate frame rate. In this example the decompressor 14 also includes a display clock generator according to the present invention. The display clock generator provides pixel rate, horizontal line rate and field/frame rate signals. The pixel rate signals are used to at least read decompressed signal from the display memory, and may be used in the decompression process per se. The line and field/frame rate signals are applied to deflection circuitry 20 which generates signals for application to display apparatus (not shown).

Decompressed video signal from the memory 17 is applied to a signal translator 18 which includes circuitry to reformat signal for display. For example the translator may contain apparatus to convert 4:2:0 format video signal to 4:2:2 format, and to convert non-interlaced signal to interlaced signal etc.

Translated signal provided from element 18 is in Y, R-Y and B-Y format. These signals are applied to a color matrix 19 which generates digital R, G and B signals and may include contrast, brightness and color correction controls. The digital R, G and B signals are applied to digital-to-analog circuitry 21 which converts the respective R, G and B signals to analog form for application to display driver circuitry (not shown).

Figure 2:
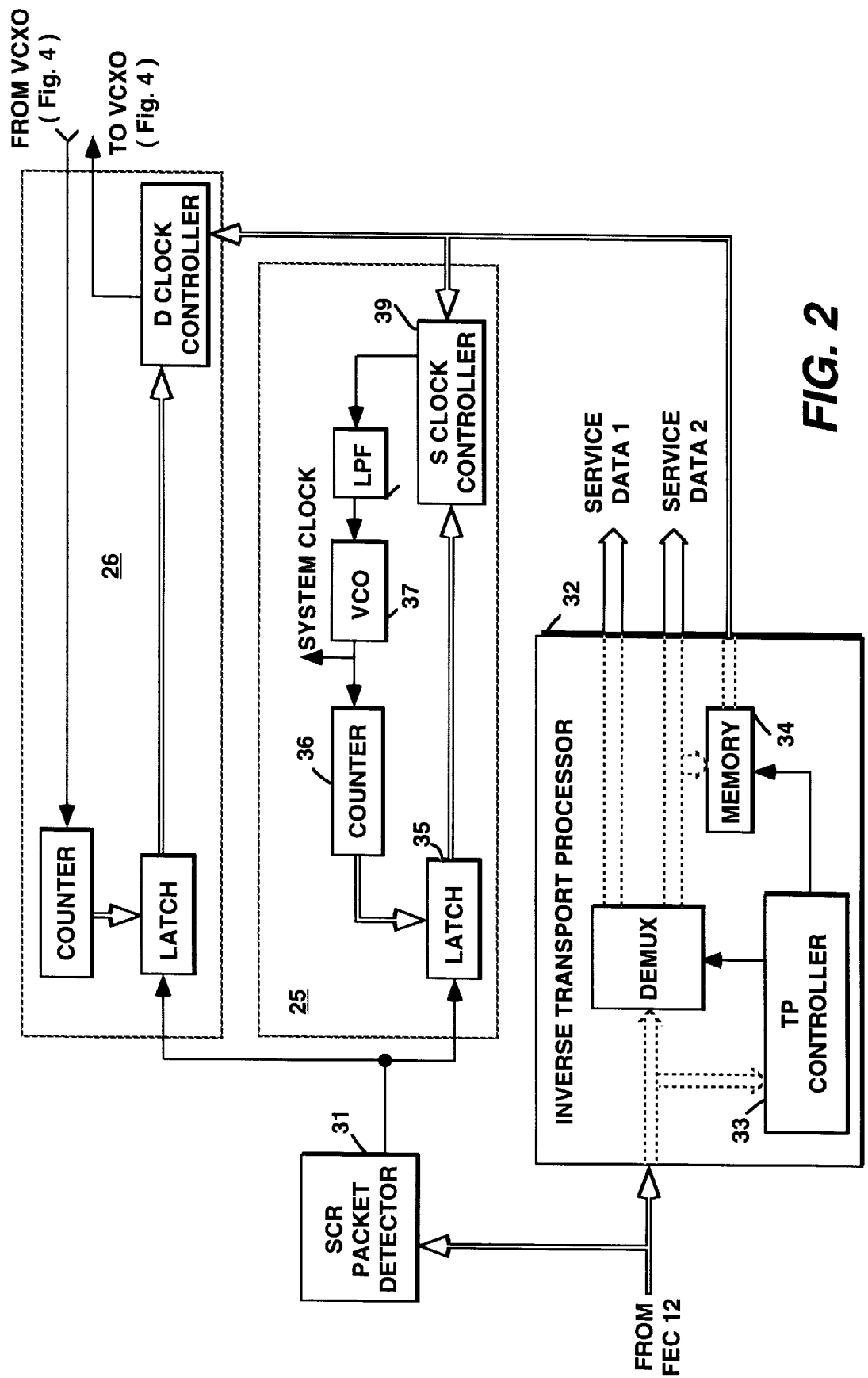
FIG. 2 is a block diagram of a receiver system clock generator for the FIG. 1 receiver.

FIG. 2 illustrates an exemplary receiver system clock generator 25. In this embodiment, data from the forward error correction circuitry 12 is coupled to an inverse transport processor 32, and a SCR packet detector 31. The inverse transport processor 32 separates transport packet header data from the respective transport packet payloads. Responsive to the transport header data, the inverse transport processor 32 applies video signal payloads (designated here as service data 1) to, for example, video decompression apparatus 14, and auxiliary data (designated as service data 2) to the appropriate auxiliary data processing elements such as the system controller 16, for example. SCR's which are typically included in the auxiliary data are routed to- and stored in a memory element, 34.

The SCR packet detector 31, which may be a matched filter arranged to recognize appropriate flags in transport packet headers, produces a control pulse on the occurrence of transport packets containing an SCR. The control pulse is applied to a latch 35, which, responsive to the control pulse, stores the count value currently exhibited by the local counter 36. The local counter 36 is arranged to count pulses provided by e.g., voltage controlled oscillator 37. The counter 36 is arranged to count modulo the same number as a counterpart counter in the signal encoder apparatus (not shown) which produces the SCR contained in the transport packet.

The voltage controlled oscillator 37 produces the receiver system clock signal, which is typically at 27 MHz. This oscillator is controlled by a low pass filtered error signal provided by a clock controller 39. The error signal may be generated in the following manner. Designate the SCR arriving at time n as $SCR_n$ and designate the count value concurrently stored in latch 35 as $L_n$. The clock controller reads the successive values of SCR's and L's and forms an error signal E proportional to the differences $$E \Rightarrow |SCR_n - SCR_{n-1}| - |L_n - L_{n-1}|$$

The error signal E, is utilized to condition the voltage controlled oscillator 37 to exhibit a frequency which tends to null the error signal E. The error signal produced by the clock controller 39 may be in the form of a pulse width modulated signal, and the low pass filter 38 may be realized in analog components.

In an alternative arrangement, the counter 36 may be initialized, on start up, to exhibit a count value equal to the first detected SCR. Thereafter an error signal may be generated proportional to the differences $(SCR_n - L_n)$. However this arrangement requires a significantly more complicated counter circuit, as well as routing circuitry to apply the first received SCR to the counter.

For either arrangement, the free running frequency of the voltage controlled oscillator must be quite close to the frequency of the system clock in the encoder/compressor.

In FIG. 2, a second clock generator 26 is included. The clock generator 26 cooperates with a VCXO as shown in the FIG. 4 apparatus to generate a pixel display clock. Operation of the clock generator 26 is similar to operation of the clock generator 25, and therefore its operation will not be described in detail.

Figure 3:
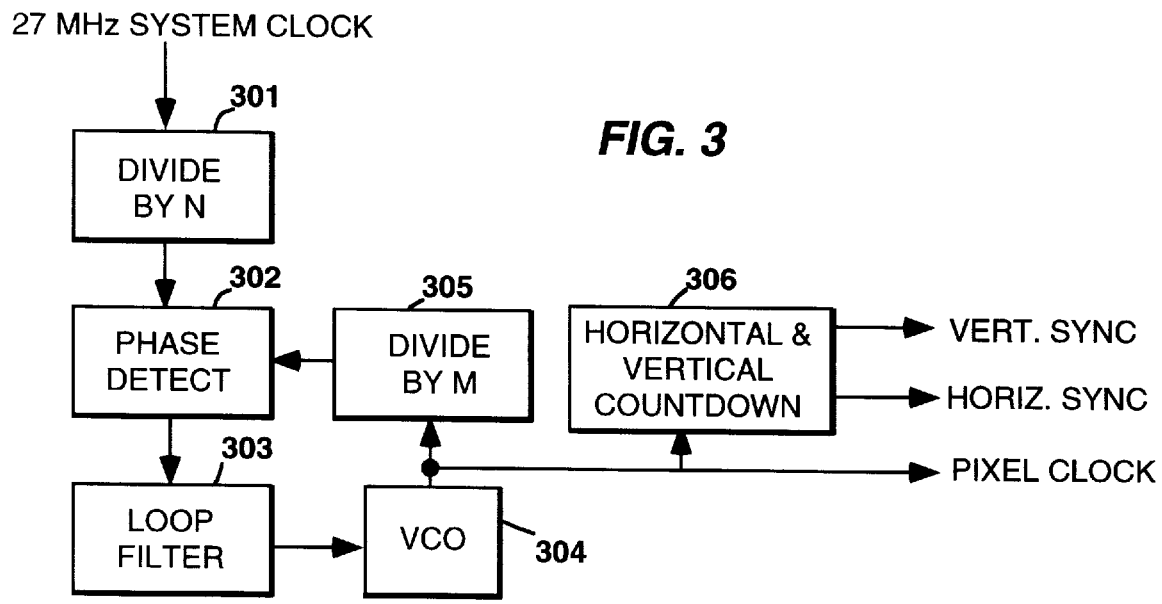
FIG. 3 is a block diagram of a programmable generator for providing video signal display synchronizing signals, embodying the invention.

Refer to FIG. 3 which illustrates a first example of the display clock generator incorporated in the video decompressor 14. Despite the display clock generator being separate from the system clock, it is advantageous that it be synchronized to the system clock. This is accomplished in FIG. 3 by phase locking the display clock with the 27 MHz receiver system clock.

In FIG. 3 the different synchronizing (frame) rates are produced by dividing the system clock which is phase locked to the display clock generator by different factors. This division is accomplished by a programmable divider 301, which under control of the decompressor controller divides the system clock by a value N. The value N is selected dependent upon the desired frame rate. For example, if the desired display frame rate is 30.000000 Hz, the selected value N is 1000. Alternatively, if the desired display frame rate is 29.97002997 . . . Hz, the selected value N is 1001.

The divided system clock signal is applied to a first input terminal of a phase comparator 302 included in a phase locked loop consisting of a loop filter 303, a voltage controlled oscillator 304 and a divide by M circuit 305. The phase locked loop is of conventional design and person's skilled in the art of signal processing will understand its operation. The output frequency of the VCO 304 and the value of factor M in the divide by M circuit 305 will be determined by the desired pixel clock frequency. For example, if the pixel clock frequency is chosen at 74.25 MHz, the value M will be 2750.

To generate the appropriate frame synchronizing signal, the pixel clock frequency is applied to a further divider in circuit 306. Assuming 2200 pixels per line, the 74.25 MHz clock is divided by 2200 to generate a 33.750 KHz line rate signal. Finally assuming 1125 lines per frame, the line rate signal is applied to a second count down circuit, in circuit 306, to divide the line rate signal by 1125 to generate the frame rate signal.

The FIG. 3 circuitry generates acceptable pixel clock and selectable frame rate signals. However, the phase detector 302-loop filter 303 combination undesirably operates with relatively low frequency error signals relative to the pixel clock frequency. A preferred embodiment, which overcomes this shortcoming is illustrated in FIG. 4.

Figure 4:
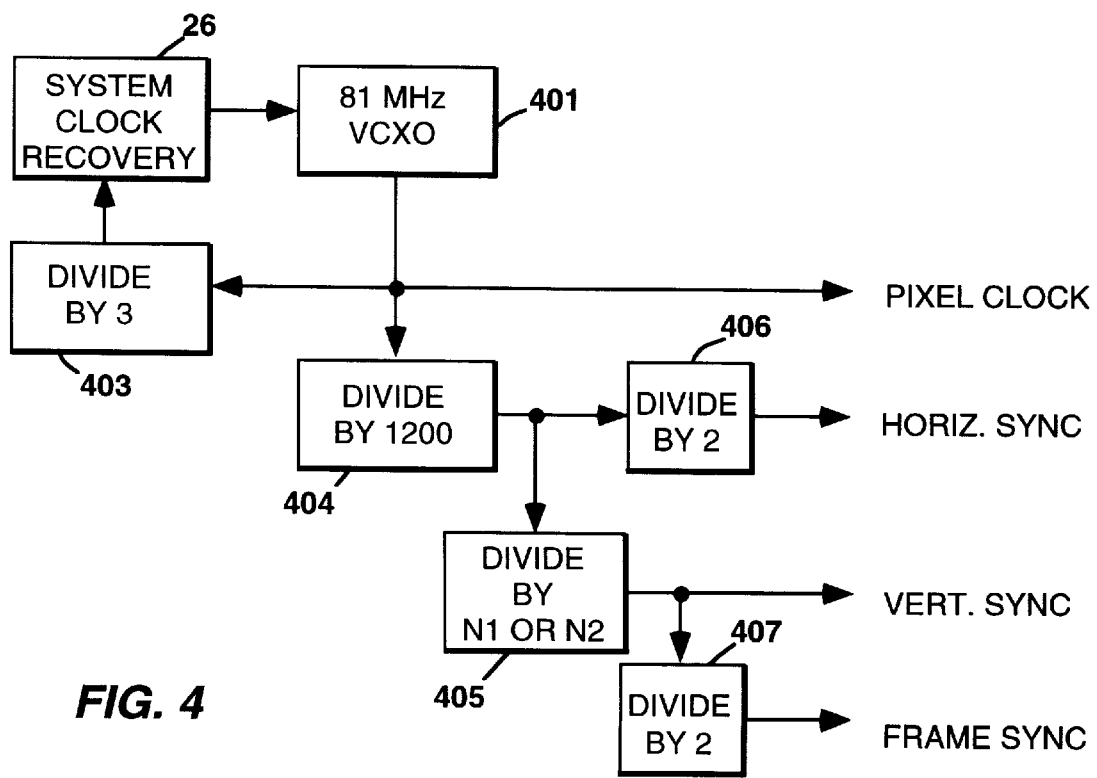
FIGS. 4, 7 and 8 are block diagrams of alternative programmable sync generators for providing video signal display synchronizing signals embodying the invention.

The system of FIG. 4 generates a pixel clock signal which is not subject to significant VCO error signals. In FIG. 4, the pixel clock is generated by a voltage controlled crystal oscillator VCXO 401. The output frequency of the VCXO (illustratively shown as 81 MHz) may be 81 MHz, 74.25 MHz, 27 MHz, etc. and is a system application decision. Because the oscillator is crystal based, the pixel clock frequency is very stable and the frequency deviation is quite small. A system requirement of a Grand Alliance receiver, for example, is that the pixel clock frequency vary by no more than 1 part in 1000 regardless of whether the frame rate is 29.97002997 . . . Hz or 30.00 Hz. This stability is easily satisfied by a VCXO, such as VCXO 401.

In the FIG. 4 arrangement, the display clocks are indirectly phase locked to the system clock. That is, the output of the VCXO 401 is phase locked to the encoder or compressor system clock via SCR's in a manner similar to the receiver system clock apparatus for phase locking to the compressor system clock. This is accomplished in the loop including the divide-by-three circuit 403 and the SCR processor 26 (of FIG. 2).

The pixel rate clock output by the VCXO 401 is coupled to a divide circuit 404. Assuming 1920 active pixels per line or 2400 total pixels per line, the divider 404 is arranged to divide the pixel rate clock by 1200 to provide a two times line rate signal. This signal is applied to a divide by two circuit to generate a horizontal synchronizing signal.

The two times line rate signal is also coupled to a programmable divider 405. Assuming 1125 lines per frame, the programmable divider 405 is adjusted to divide the two times line rate signal by, for example 1125 to produce a 60 Hz vertical or field rate signal. The output of divider 405 is coupled to a divide by two circuit 407 to generate the frame rate synchronizing signal.

It is not possible to divide the two times line rate signal (or the line rate signal) by a whole number to generate a frame rate signal of 29.97002997 . . . Hz, corresponding to a 59.94005994 Hz vertical signal. In order to generate the 59.94005994 . . . Hz vertical rate signal, the division factor applied to the programmable divider 405 is periodically changed between 1125 and 1127 lines per frame. If the divisor 1125 is represented by "0" and the divisor 1127 is represented by "1", and the divisors applied to the programmable divider 405 occur in a repeating 16 frame sequence according to the pattern 0000000111111111, the average field rate (vertical rate) will be exactly 59.95005994 . . . Hz. The repeating 16 frame sequence may be rearranged according to the pattern 1010101101010101 i.e., 1010101101010101.1010101101010101.1010101101010101 (where the "." are included only to indicate the demarcation between sequences) to produce an effective instantaneous 59.94005994 . . . Hz vertical rate. When this alternating divisor pattern is applied to counter 405, the divide by two circuit 407 provides a 29.97002997 . . . Hz frame rate synchronizing signal.

If interlaced signals are to be produced, vertical or field rate signals are needed, which signals are generated as described above. Note, in the above description, the divisors applied to the divider 405 are toggled at a frame rate, not the field rate. The divisors are toggled at the frame rate to insure that the extra lines which occur in frames produced by division by 1127, are divided between both the odd and even fields.

If the respective decompressor is arranged to output only non interlaced signal, the divider 404 may be conditioned to count down by 2400 rather than 1200. In this instance, both divide by two circuits 406 and 407 are unnecessary. The programmable divider 405 will directly provide the frame rate signals.

Figure 5:
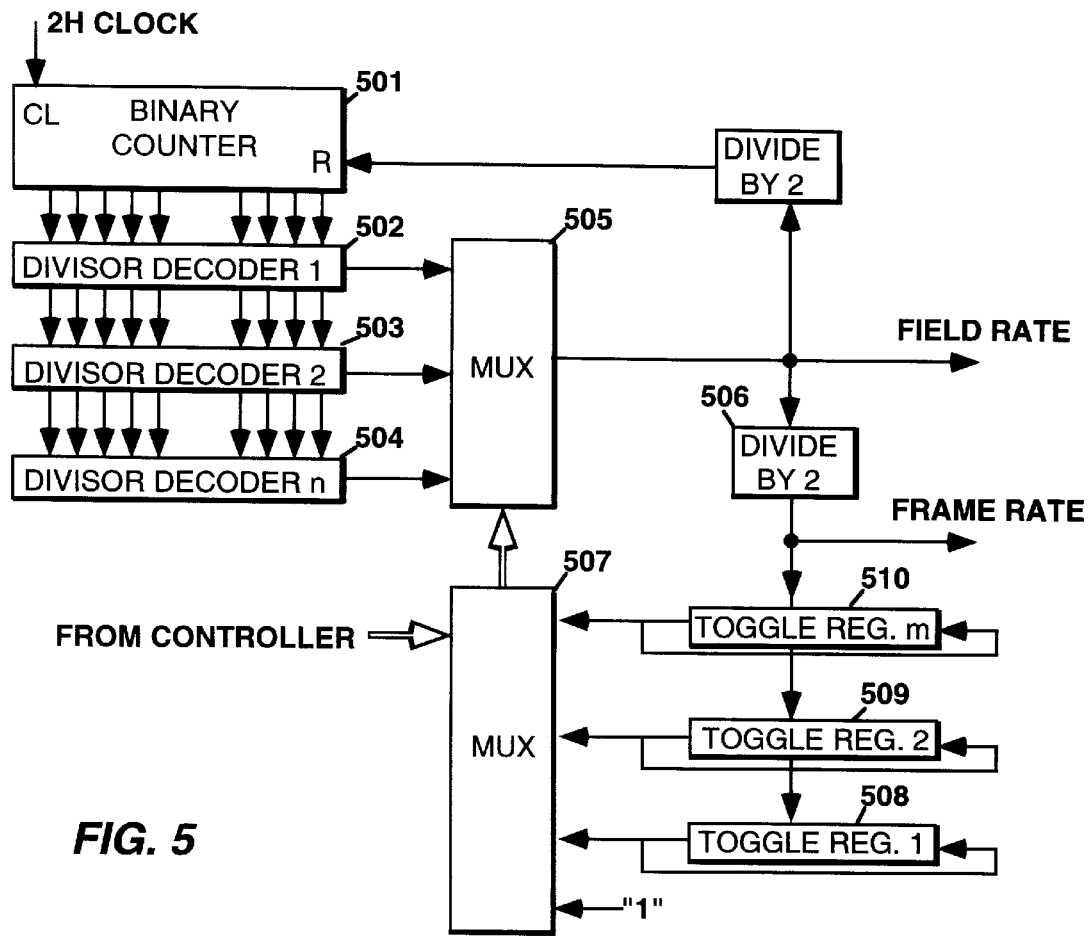
FIGS. 5 and 6 are block diagrams of alternative programmable dividers which may be implemented in the FIG. 4 apparatus.

FIG. 5 illustrates exemplary programmable divider circuitry which may be toggled between various divisors. A binary counter 501 is clocked by the two times horizontal rate signal and reset by the frame rate signal. (For simplicity, it is assumed that all of the FIG. 5 circuits are edge triggered.) The parallel output signals provided by the binary counter are applied to a plurality of decoders 502–504. The respective decoders provide an output pulse when counter 501 reaches a count value corresponding to a respective divisor associated with the respective decoder. For example, decoder 1 may correspond to a division by 1125. In this instance, the decoder 1 will output a pulse on the occasion of the counter 501 outputting a count value of 1125 indicating the occurance of 1125 pulses of the 2H clock signal. The outputs of the respective decoders 502–504 are applied to respective input terminals of a multiplexor 505. The output of the multiplexor 505 is the vertical rate signal.

The multiplexor 505 is conditioned to couple different ones of the decoders to its output according to a divisor toggle pattern. The toggle pattern is selected by the decompressor controller (or system controller) by controlling a further multiplexor 507.

A plurality of toggle patterns are loaded in a plurality of shift registers 508–510, each of which contains an exclusive pattern. The toggle patterns in the respective shift registers are a sequence of control signals for controlling the multiplexer 505. These control signals are shifted out of the selected shift register by the output frame rate signal and applied to respective input terminals of the multiplexor 507. These patterns are recirculated in the respective registers via a feedback connection to produce repetitive toggle patterns. The multiplexor 507 selects one shift register according to the desired frame rate (toggle pattern). A toggle pattern may provide a multiplexor 505 control signal to continuously couple one decoder to its output, or to sequentially (at the frame rate) couple two or more of the decoder output connections to the multiplexor 505 output. For the system described with respect to FIG. 4, the FIG. 5 apparatus may have the plurality of decoders reduced to two, one representing the divisor 1125 and one representing the divisor 1127. In addition, only a single toggle pattern register is needed.

Figure 6:
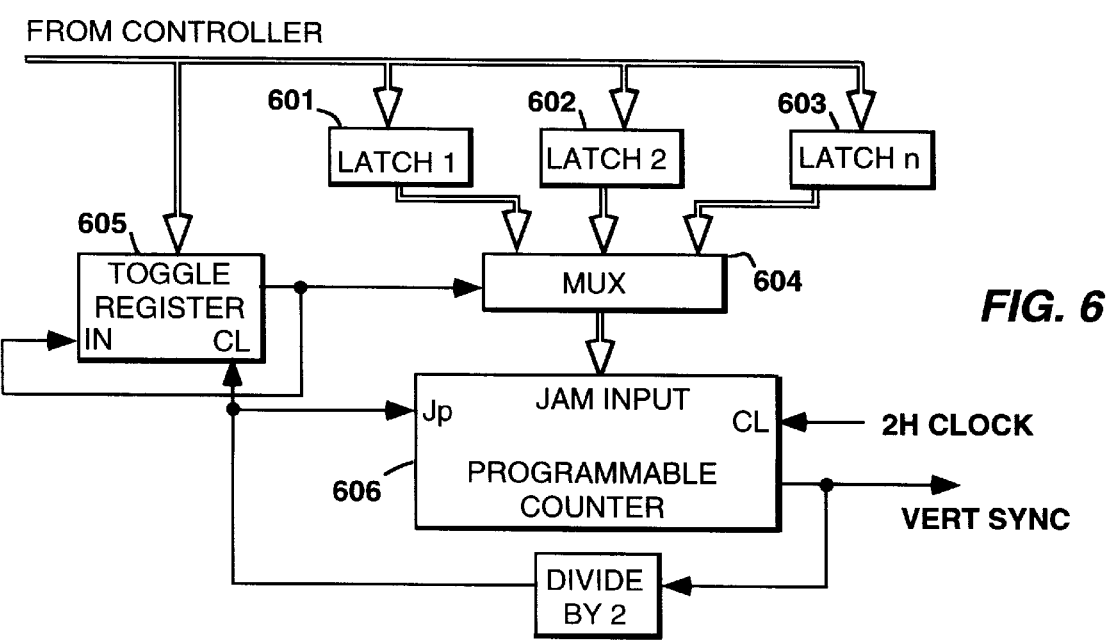

Programmable counters of the form illustrated in FIG. 5 become unwieldy if a large variety of divisors and a large variety of toggle patterns are desired. FIG. 6 illustrates another form of programmable counter which has greater versatility. In FIG. 6, a programmable down counter 606 is programmed by values corresponding to respective divisors, via a multiplexor 604. The multiplexor 604 is toggled at the frame rate by a toggle pattern loaded in a toggle register 605. The respective programming values are contained in respective latches 601–603 having respective output connections coupled to the multiplexor 604. The desired programming values and the toggle patterns are loaded in the latches 601–603 and the register 605 by either the system or decompression controller. The decompression controller, responsive to the compressed video signal, will detect the frame rate of the current video signal. Responsive to the detected frame rate, the system will select the appropriate toggle pattern and divisors stored in system memory (not shown) and apply them to the appropriate latches 601–603 and the register 605. The register will then be energized to operate the multiplexer 604 to condition the counter 606 to count in accordance the desired alternating divisor sequence.

Figure 7:
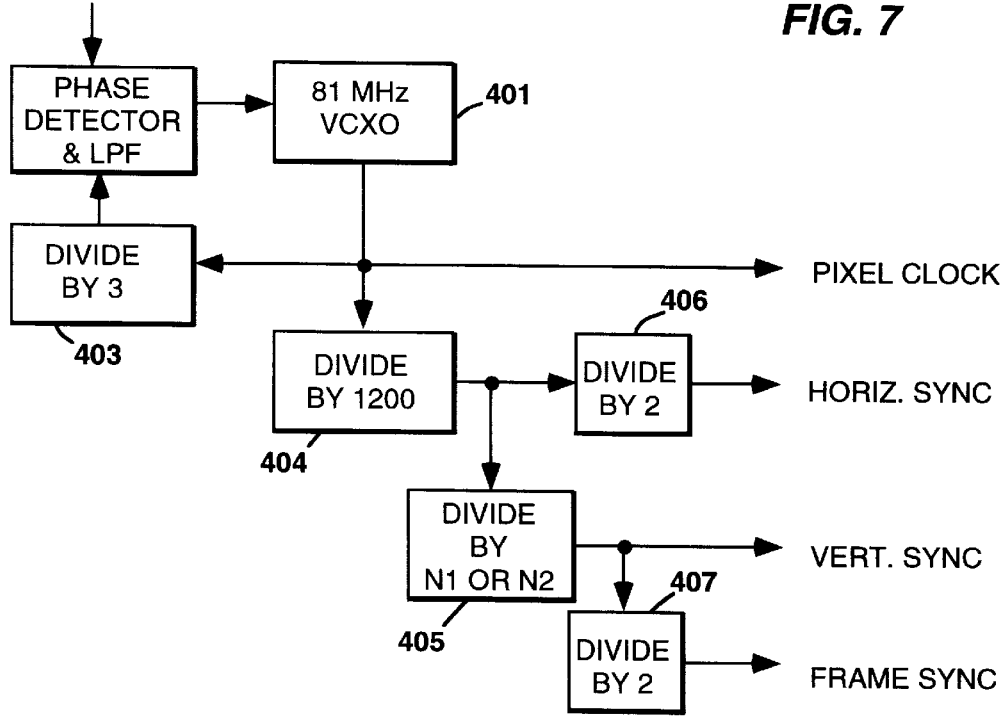

FIG. 7 is a programmable synchronizing signal generator which is a hybrid of the FIG. 3 and FIG. 4 circuits. This circuit includes a VCXO which is synchronized directly to the 27 MHz receiver system clock, rather than indirectly as in the FIG. 4 circuit. The operation of the remainder of the FIG. 7 embodiment is similar to the operation of elements designated with like numbers in the FIG. 4 circuitry.

The concept of alternating count values or divisors can be extended to provide other frame rates not producible by whole number division. However for generating video signal interlaced frame synchronizing signals, the divisors will preferably be odd numbers because of the odd number of lines per interlaced frame. Instead of toggling between 1125 and 1127, toggling between divisors 1121 and 1131 may be used. Any frame rate between 30.107 Hz and 29.84 Hz may be supported by appropriate toggling between divisors.

Toggling between a larger number of divisors over a frame sequence will enable generating a larger number of frame rates. Different sequences of alternative divisors may be employed to produce different frame rates. In addition, a controller such as a microprocessor may be programmed to adaptively apply different divisors not in repeating sequences. For example, consider that it is desired to generate frame synchronizing signals which track a non-standard source, which source provides a frame synchronizing signal. Such a system is illustrated in FIG. 8.

Figure 8:
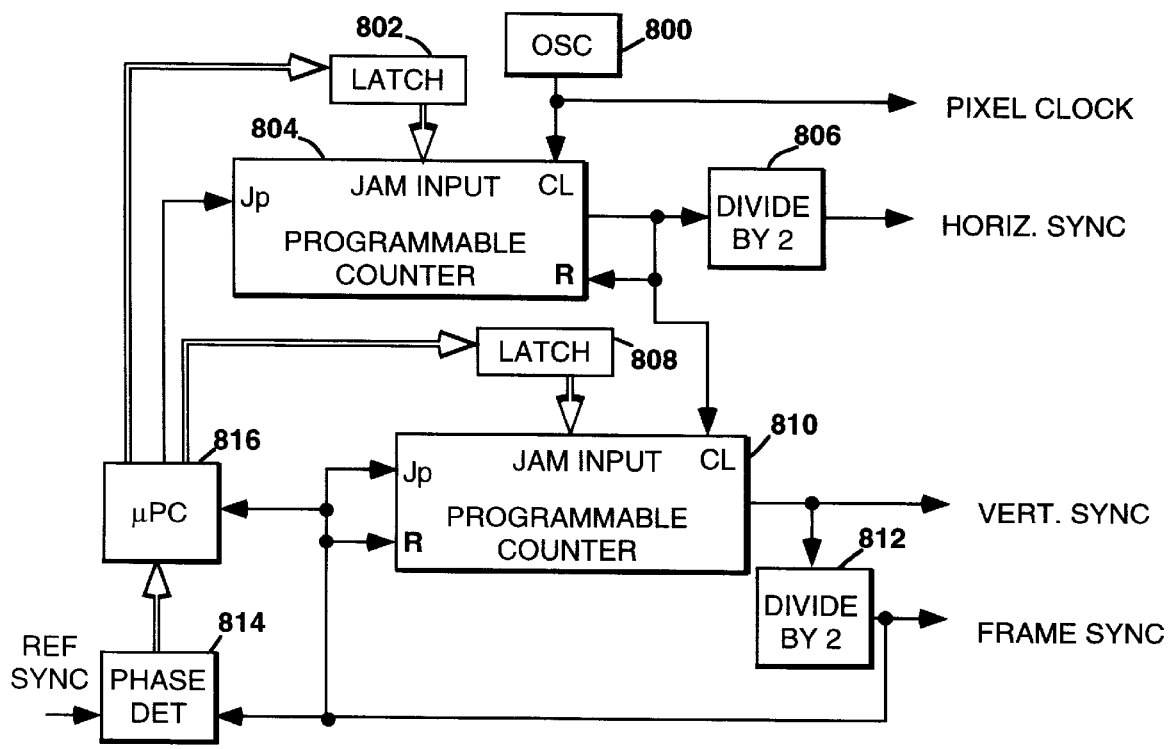

In FIG. 8, a pixel clock is generated by an oscillator 800, which may be a free running crystal oscillator or a controlled oscillator in a phase or frequency locked loop as illustrated in the other embodiments. The pixel clock signal is applied to a first programmable counter 804. Counter 804, in this instance is programmable so that a system (such as the FIG. 1 system) can accommodate a variety of pixel per line formats. Counter 804 is conditioned by the processor 816, which may be a microprocessor system controller, to divide the pixel clock signal by the appropriate factor to provide the desired horizontal rate or twice horizontal rate (2H) signals. That is, on initialization of the system the processor 816 applies a value corresponding to the divisor to the latch 802, which value is then loaded into the counter 804 responsive to a jam pulse $J_p$ also provided by the processor 816. Counter 804 provides an output pulse on the occurrence of a number of pixel clock pulses equal to one half the pixel periods of a total horizontal line for 2H signal, (or equal to the pixel periods of a total horizontal line for 1H signal if so programmed). The counter 804 is reset by each respective pulse output thereby, and thus effectively counts modulo W, where W is established by the value set in the latch 802.

The 2H signal is divided down by 2 in divider 806 to provide the horizontal synchronizing signal. It is also applied as a clock to a second programmable counter 810. Counter 810 is conditioned by values set in a latch 808 to divide the 2H signal to provide a vertical rate signal. The vertical rate signal is divided by 2 in circuit 812, to generate a frame synchronizing signal. The frame synchronizing signal is applied to the input control terminal $J_p$ of the counter 810 to apply a value corresponding to the desired divisor to the JAM INPUT port of the counter 810, each frame period. The value corresponding to the desired divisor may be constant or it may be changing.

The frame synchronizing signal is applied to one input of a comparator 814, shown in this instance as a phase detector. A reference frame rate signal REF SYNC is applied to a second input of the comparator. An output from the comparator is applied to the processor 816. The processor, responsive to the values provided by the comparator, generates values corresponding to the requisite divisor or divisors, and applies same to the latch 808. Note that new divisors are applied to the counter 810 only after a full frame count. That is, the counter 810 is not interrupted during a frame period to update a newly calculated divisor value. It should be appreciated that since updating the value corresponding to the divisor during respective frame periods is not permitted, all but the slowest of processors will have sufficient time, during respective frame periods, to generate and apply the necessary sequence of divisor values to the latch 808.

Figure 9:
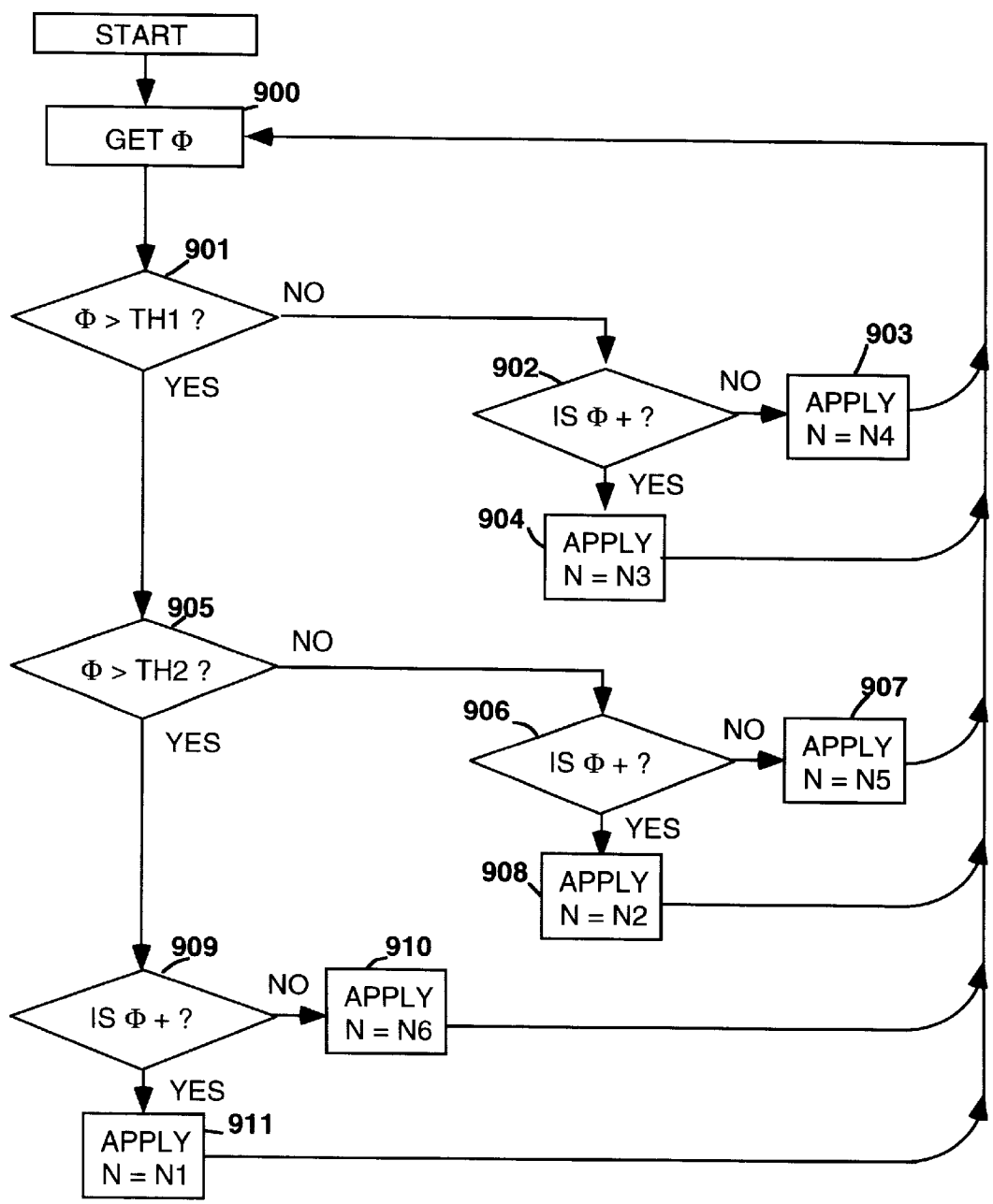
FIG. 9 is a flow chart illustrating the programming of the programmable counter for generating vertical synchronizing signals in the FIG. 8 apparatus.

An exemplary algorithm for generating a sequence of divisor values (or values corresponding to divisor values) is illustrated by the flow chart of FIG. 9. This algorithm applies one of six different values N1–N6, corresponding to six different divisors, to the latch 808 each frame period. The greater/lesser the frame rate is from the desired frame rate, the greater/lesser the applied value, so as to effect faster attack times. Assuming a pixel clock of 81 MHz and approximately 1125 lines per frame, the exemplary values N1–N6 may be N1=1121; N2=1123; N3=1125; N4=1127; N5=1129; N6=1131. This algorithm assumes a system similar to FIG. 8 in which phase difference values Φ are applied from a phase detector 814 to the controller 816. In the process, the current phase difference value, Φ, is sampled {900} and tested {901}. If Φ is less than a first threshold value TH1 (indicating slight deviation from REF SYNC), it is tested {902} for polarity. If the polarity is positive a value corresponding to divisor N3 is accessed {904} from processor memory and applied to the latch 808, else a value corresponding to divisor N4 is applied {903} to the latch 808. Then the system returns to step {900} to wait for the next phase difference signal.

If at step {901} Φ is greater than the first threshold value, it is further tested {905} against a second larger threshold value TH2. If Φ is less than the second threshold value TH2 (indicating slightly greater deviation from REF SYNC), it is tested {906} for polarity. If the polarity is positive a value corresponding to divisor N2 is accessed {908} from processor memory and applied to the latch 808, else a value corresponding to divisor N5 is applied {907} to the latch 808. Then the system returns to step {900} to wait for the next phase difference signal.

If at step {905} Φ is greater than the second threshold value TH2 (indicating even greater deviation from REF SYNC), it is tested {909} for polarity. If the polarity is positive a value corresponding to divisor N1 is accessed {911} from processor memory and applied to the latch 808, else a value corresponding to divisor N6 is applied {910} to the latch 808. Then the system returns to step {900} to wait for the next phase difference signal.

Variations on this algorithm may easily be derived. For example the phase difference signal may be filtered or integrated before testing against the various threshold values. In addition constraints may be placed on the sequence of values applied to the latch. For example, application of the larger values N1 (N6) may be constrained not to occur twice in successive frames. As another alternative, once the system is substantially synchronized, ones of the values N1–N3 may be forced to alternate with ones of values N4–N5 etc. Another variation may include the use to even and odd divisors.

The embodiment of FIG. 8 was described in the environment of a video signal processing system, however, it will be appreciated by those skilled in circuit arts, that it may be implemented in a wide variety of systems requiring generation of phase or frequency tracking synchronizing signals.

What is claimed is:

1. Synchronizing signal generating circuitry, for selectably providing synchronizing signals having different frequencies, comprising:

a phase locked loop source of a clock signal;

a divider, coupled to and external to said source, for dividing said clock signal to generate said synchronizing signals;

a source of reference signal;

a detector for detecting a difference between the synchronizing signal and said reference signal;

selection circuitry, responsive to said difference and said synchronizing signal for conditioning said divider to divide the clock signal by a sequence of alternate divisors, wherein said divider divides said clock signal by each said alternate divisor in a sequence for no less than a period of said synchronizing signal.

2. In an MPEG-compatible compressed video signal processing apparatus, synchronizing signal generating apparatus for selectably generating synchronizing signals at different frequencies, comprising:

a source of MPEG-compatible compressed video signal;

an inverse transport processor including means responsive to said MPEG-compatible compressed video signal for generating a system clock signal for energizing at least in part said source and said inverse transport processor;

an MPEG-compatible video signal decompressor coupled to said inverse transport processor, including means responsive to said MPEG-compatible compressed video signal for providing a control signal determinative of a frame rate decompressed said video signal is to be displayed;

phase locking circuitry, responsive to said MPEG-compatible compressed video signal for generating a system clock for operating, at least in part, said inverse transport processor;

a phase locked loop, coupled to said system clock for generating a pixel clock signal having a frequency higher than said system clock, for operating, at least in part, said MPEG-compatible video signal decompressor;

a frequency divider, for dividing the frequency of said pixel clock to generate said synchronizing signals; and sequencing circuitry, responsive to said control signal and to generated said synchronizing signals for selecting from a plurality, greater than two, of alternative divisors, for applying selected divisors to said frequency divider, said sequencing circuitry selecting different sequences of divisors for different frequency synchronizing signals indicated by said control signal.

3. The apparatus set forth in claim 2 further including circuitry for phase locking said pixel clock signal to said system clock signal.

4. The apparatus set forth in claim 3 wherein said circuitry for phase locking said pixel clock signal to said system clock signal comprises:

a controlled oscillator for providing said pixel clock signal;

a source of transmitted data packets, ones of which include system clock references (SCR's);

circuitry for extracting said system clock references from said data packets;

a modulo counter for counting pulses of said pixel clock signal or a submultiple thereof;

storage means for storing count values provided by said modulo counter at predetermined instances to generate local clock references;

control circuitry, responsive to said system clock references and said local clock references for generating a control signal to control said controlled oscillator;

a further controlled oscillator for providing said system clock signal;

a further modulo counter for counting pulses of said system clock signal or a submultiple thereof;

storage means for storing count values provided by said further modulo counter at predetermined instances to generate further local clock references; and control circuitry, responsive to said system clock references and said further local clock references for generating a control signal to control said further controlled oscillator.

5. Synchronizing signal generating circuitry, for selectably providing synchronizing signals having different frequencies, comprising:

a source of a clock signal having a frequency;

a divider coupled to said source for dividing said clock signal frequency to generate said synchronizing signals; and sequencing circuitry, responsive to said synchronizing signals, for applying a plurality of different sequences of alternate divisors to said divider to produce different output synchronizing signal frequencies, at least some divisors being applied in repeating sequences of alternate divisors with respective divisors in a sequence being applied to said divider for at least one period of said synchronizing signal.

6. The synchronizing signal generating circuitry set forth in claim 5 wherein at least one repeating sequence includes two substantially alternating divisors and such sequence has a duration of an odd number of synchronizing signal periods.

7. The synchronizing signal generating circuitry set forth in claim 5 wherein at least one repeating sequence includes at least two alternate odd valued divisors having values in the range of 1121 to 1131 inclusive.

8. Synchronizing signal generating circuitry, for selectably providing vertical synchronizing signals having different frequencies, comprising:

a source of synchronizing reference signal;

a source of a clock signal frequency;

a divider coupled to said source for dividing said clock signal frequency to generate said synchronizing signals;

a detector, responsive to said synchronizing reference signal and said synchronizing signal for determining phase/frequency differences there between;

sequencing circuitry, responsive to said synchronizing signals and said differences, for applying a plurality of alternate divisors to said divider, to produce said synchronizing signal, said sequencing circuitry having facility to cause said divider to produce different synchronizing signal output frequencies by applying different sequences of alternate divisors to said divider, and wherein respective divisors are applied to said divider for no less than one period of said synchronizing signal.

9. The synchronizing signal generating circuitry set forth in claim 8 wherein said sequencing circuitry includes a comparator for comparing phase signals from said detector to a plurality of different threshold values and determining sequential divisor values from the magnitude and polarity of the phase signals.

10. The synchronizing signal generating circuitry set forth in claim 8 wherein said sequencing circuitry includes a comparator for comparing phase signals from said detector to a threshold value and selects from one of first and second divisors if a phase value is less than the threshold and selects from third and fourth divisor values if the phase value does exceed said threshold value.

11. The synchronizing signal generating circuitry set forth in claim 8 wherein said source of synchronizing reference signal includes:
 a detector for detecting transmitted compressed digital video signal including control information;
 decompressor circuitry responsive to detected said compressed video signal, having an output at which said control information is available; and
 means for extracting said synchronizing reference signal from said control information.

12. Synchronizing signal generating circuitry, for selectably providing synchronizing signals having different frequencies, comprising
 a source of a clock signal;
 a divider coupled to said source for dividing said clock signal to generate said synchronizing signals; and
 circuitry for conditioning said divider to divide the clock signal by a sequence of alternate divisors; wherein
 said source comprises a controlled oscillator, having a control input port and an output port at which a primary clock signal is available; and
 a divider circuit coupled to said output port, for dividing said primary clock signal by a constant factor to provide said clock signal; wherein
 said controlled oscillator provides a primary clock signal of 81 Mhz, said divider circuit divides the primary clock signal by 1200, and said circuitry for conditioning said divider to divide the clock signal conditions the divider to alternately divide by 1000 and 1001.

13. A method for generating synchronizing signal comprising:
 providing a clock signal having a frequency which is a non-integer multiple of the synchronizing signal frequency;
 providing a reference signal;
 providing a threshold value;
 frequency dividing the clock signal in a frequency divider having an output at which said synchronizing signal is available;
 generating a signal representative of differences in phase between the synchronizing signal from said divider and the reference signal;
 comparing the threshold value with said signal representative of differences;
 selecting one of a first and second divisor value if the signal representative of differences is greater than the threshold; or
 selecting one of a third and fourth divisor value if the threshold is greater than the signal representative of differences; and
 causing said frequency divider to divide said clock signal by respective selected divisors.

14. The method set fourth in claim 13 further including selecting a set of first, second, third, and fourth divisor values from a plurality of sets of values depending upon a desired synchronizing signal frequency.

15. The method set fourth in claim 13 wherein the step of causing the frequency divider to divide said clock signal by respective selected divisors, causes division by each selected divisor for no less than a cycle of said synchronizing signal.

* * * * *